United States Patent
Khabashesku et al.

(10) Patent No.: US 8,003,215 B2
(45) Date of Patent: Aug. 23, 2011

(54) FLUORINATED NANODIAMOND AS A PRECURSOR FOR SOLID SUBSTRATE SURFACE COATING USING WET CHEMISTRY

(75) Inventors: Valery N. Khabashesku, Houston, TX (US); Yu Liu, Houston, TX (US); Nancy J. Halas, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/948,911

(22) Filed: Nov. 18, 2010

(65) Prior Publication Data

US 2011/0065946 A1    Mar. 17, 2011

Related U.S. Application Data

(62) Division of application No. 11/273,054, filed on Nov. 14, 2005, now Pat. No. 7,858,186.

(60) Provisional application No. 60/627,722, filed on Nov. 12, 2004.

(51) Int. Cl.
*B32B 9/00*    (2006.01)

(52) U.S. Cl. ...................................... 428/408; 423/447.1

(58) Field of Classification Search .................. 428/408; 423/447.1, 445 R; 427/29.1
See application file for complete search history.

(56) References Cited

U.S. PATENT DOCUMENTS

| | | | |
|---|---|---|---|
| 5,423,475 A * | 6/1995 | Burke | 228/193 |
| 6,348,240 B1 | 2/2002 | Calvert | |
| 6,592,839 B2 * | 7/2003 | Gruen et al. | 423/446 |
| 2005/0158549 A1 * | 7/2005 | Khabashesku et al. | 428/403 |
| 2006/0269467 A1 * | 11/2006 | Khabashesku et al. | 423/446 |

OTHER PUBLICATIONS

H. O. Pierson, Handbook of Carbon, Graphite, Diamond and Fullerenes. Properties, Processing and Applications. Noyes Publ., Park Ridge, New Jersey, USA, 1993.
Liu et al., "Functionalization of Nanoscale Diamond Powder: Fluoro-, Alkyl-, Amino-, and Amino Acid-Nanodiamond derivatives", 16 Chem. Mater. (2004), pp. 3924-3930.
Liu et al., "Fluorinated Nanodiamond as a Wet Chemistry Precursor for Diamond Coatings Covalently Bonded to Glass Surface," 127 J. Am. Chem. Soc., (2005), pp. 3712-3713.
P. Ball, "Sticky prospects for coats of diamond dust," 434 Nature (2005), p. 580.
V. Y. Dolmatov, "Detonation synthesis ultradispersed diamonds: properties and applications", 70 Russian Chemical Reviews (2001), pp. 607-626.
Liu, et al. Rice Quantum Institute 16th Annual Summer Research Colloquium. Aug. 9, 2002, Houston, TX, Abstr. p. 2.
Khabashesku, V. N. "Functionalization of Carbon Nanomaterials for Bio-Medical Applications" in Proceedings of International Meeting of German Society of Gerontology and Geriatrics: Extending the Life Span, Sep. 24-26, 2003, Hamburg, Germany.

* cited by examiner

*Primary Examiner* — David R Sample
*Assistant Examiner* — Daniel Miller
(74) *Attorney, Agent, or Firm* — Winstead PC

(57) ABSTRACT

The present invention is directed to nanodiamond (ND) surface coatings and methods of making same. Such coatings are formed by a covalent linkage of ND crystals to a particular surface via linker species. The methods described herein overcome many of the limitations of the prior art in that they can be performed with standard wet chemistry (i.e., solution-based) methods, thereby permitting low temperature processing. Additionally, such coatings can potentially be applied on a large scale and for coating large areas of a variety of different substrates.

15 Claims, 11 Drawing Sheets

Scheme 1

Scheme 1

Scheme 2

FLUORINATED NANODIAMOND AS A PRECURSOR FOR SOLID SUBSTRATE SURFACE COATING USING WET CHEMISTRY

CROSS-REFERENCE TO RELATED APPLICATIONS

This application for Patent is a divisional application of U.S. patent application Ser. No. 11/273,054, filed on Nov. 14, 2005, which claims priority to U.S. Provisional Patent Application Ser. No. 60/627,722, filed on Nov. 12, 2004.

The present invention was made with support from the Texas Higher Education Coordinating Board's Advanced Technology Program and the Robert A. Welch Foundation.

FIELD OF THE INVENTION

This invention relates generally to diamond (surface) coatings, and specifically to methods of applying such coatings to solid substrate surfaces using wet chemistry.

BACKGROUND

Diamond materials have attracted tremendous attention for centuries due to their wide range of extreme properties. The applications of diamond are further extended when diamond particles are used to coat substrate surfaces. Currently, the most common methods for the fabrication of diamond thin films and coatings use chemical vapor deposition (CVD), involving a gas-phase chemical reaction occurring above a solid surface which becomes coated as a result of diamond deposition (H. O. Pierson, *Handbook of Carbon, Graphite, Diamond and Fullerenes. Properties, Processing and Applications*. Noyes Publ., Park Ridge, N.J., USA, 1993). While various CVD methods differ in their details, they all share common features such as sophisticated and costly equipment (e.g., vacuum chamber, reactor, furnace, and heater or plasma generator, gas flow meters/controllers, etc.), extreme reaction conditions (e.g., temperature in the range of 1000-1400 K), and precise control of gas flow. This group of methods also requires the substrate to be resistant to high temperature and show modest reactivity towards carbon.

Therefore, as a result of the inherent difficulties with the above-described CVD methods of generating diamond coatings, efforts directed toward the development of alternative, facile and low-cost methods for coating substrate surfaces with diamond are worth pursuing.

BRIEF DESCRIPTION OF THE INVENTION

In some embodiments, the present invention is directed to nanodiamond (ND) surface coatings and methods of making same. Such coatings are formed by a covalent linkage of ND crystals (crystallites) to a particular surface via linker species. The methods described herein overcome many of the limitations of the prior art in that they can be performed with standard wet chemistry (i.e., solution-based) methods, thereby permitting low-temperature processing. Additionally, such coatings can potentially be applied on a large scale and for coating large areas of a variety of different substrates.

In some embodiments, the present invention is directed to methods comprising the steps of: (a) providing a quantity of fluorinated nanodiamond (i.e., fluoronanodiamond, F-ND) and a functionalized surface comprising functional moieties capable of reacting with the fluorinated nanodiamond; and (b) reacting the fluorinated nanodiamond with the functionalized surface to form a nanodiamond coating on the surface, said nanodiamond coating comprising nanodiamond crystals covalently linked to the surface. In some such embodiments, the functionalized surface is selected from the group consisting of a functionalized ceramic surface, a functionalized glass surface, a functionalized polymer surface, a functionalized semiconductor surface, a functionalized metal surface, and combinations thereof. In some such embodiments, the surface is functionalized with 3-aminopropyltriethoxysilane (APTES), and the reacting is carried out in a liquid. In some embodiments, there is a further step of washing to remove any unbound nanodiamond from the surface.

In some embodiments, the present invention is directed to methods comprising the steps of: (a) providing a quantity of fluorinated nanodiamond; (b) reacting the fluorinated nanodiamond with a linker species to give a nanodiamond-linker complex; and (c) reacting the nanodiamond-linker complex with a surface to form a nanodiamond coating on the surface, said nanodiamond coating comprising nanodiamond crystals covalently linked to the surface. In some such embodiments, the surface is selected from the group consisting of a ceramic surface, a glass surface, a polymer surface, a semiconductor surface, a metal surface, and combinations thereof. In some such embodiments, the surface comprises functional moieties operable for covalent bonding with the nanodiamond-linker complex. In such embodiments, the reacting steps are typically carried out in a liquid.

In some embodiments, the present invention is directed to a nanodiamond coated surface comprising: (a) a surface; and (b) nanodiamond crystallites, wherein the nanodiamond crystallites are covalently bound to the surface via independent linker species. In some such embodiments, the surface is selected from the group consisting of a ceramic surface, a glass surface, a polymer surface, a functionalized semiconductor surface, a metal surface, and combinations thereof. In some such embodiments, the independent linker species is provided by APTES. In some such embodiments, the average crystallite size in the range of from about 2 nm to about 20 nm.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
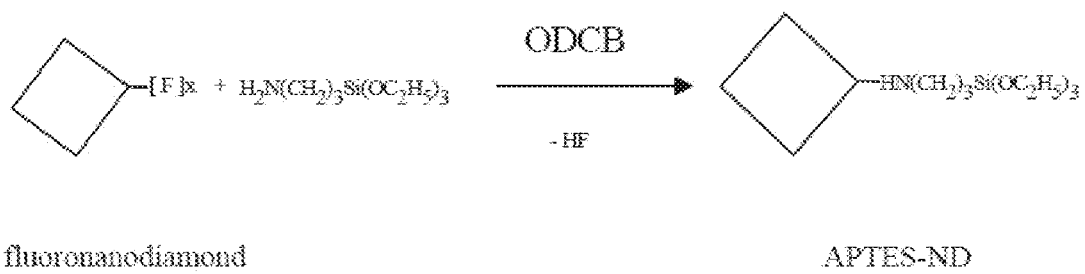
FIG. 1 (Scheme 1) depicts the formation of a nanodiamond-linker complex (e.g., APTES-ND), in accordance with some embodiments of the present invention.

In some embodiments, the present invention is directed to nanodiamond (ND) surface coatings and methods of making same. Such coatings are formed by a covalent linkage of ND crystals (i.e., crystallites) to a particular surface via linker species. The methods described herein overcome many of the limitations of the prior art in that they can be performed with standard wet chemistry (i.e., solution-based) methods, thereby permitting low-temperature processing. Additionally, such coatings can potentially be applied on a large scale and for coating large areas of a variety of different substrates.

In general terms, methods of coating surfaces with ND, in accordance with some embodiments of the present invention, comprise the steps of 1) providing a quantity of fluorinated nanodiamond (F-ND) and a functionalized surface comprising functional moieties capable of reacting with the fluorinated nanodiamond; and 2) reacting the F-ND with the functionalized surface to form a ND coating on the surface, said ND coating comprising ND crystals covalently linked to the surface. In some embodiments, a washing step is employed to remove unbound ND crystallites. Typically, the ND surface coatings of the present invention have a thickness that approximates that of the ND crystallite diameter. See Liu et al., *Chem. Mater.* 2004, 16, 3924-3930, incorporated by reference herein, for a description of how to prepare F-ND and for examples of the chemistry F-ND can undergo. See also Liu et al., "Fluorinated Nanodiamond as a Wet Chemistry Precursor for Diamond Coatings Covalently Bonded to Glass Surface," *J. Am. Chem. Soc.,* 2005, 127, 3712-3713, incorporated herein by reference; and P. Ball, "Sticky prospects for coats of diamond dust," *Nature,* 2005, 434, 580 (highlighting Applicants' work).

In some embodiments, the functionalized surface comprises amine moieties capable of reacting with the fluorine moieties on the F-ND. Said functionalized surface can comprise any combination of surface and functional moieties suitable for reacting with F-ND either directly, or through additional linker species. An exemplary surface is glass (e.g., silica glass), which can be in the form of sheets or fibers. Glass can easily be functionalized with amino group terminated functionalities by way of silane-based chemistry. An exemplary way of functionalizing glass is by reacting it with a species such as 3-aminopropyltriethoxysilane (APTES). Covalent bonds can be formed between the APTES molecule and the substrate through the hydrolysis of the APTES ethoxy groups, followed by a coupling condensation involving hydroxyl (—OH) groups on the glass surface. Other suitable surfaces that can be so coated include, but are not limited to, silicon and steel.

The present invention provides a convenient and cost-effective alternative to diamond CVD coating methods. Variations of such above-described wet chemistry methods can be extended to the ND coating of other substrates, such as quartz, silicon, and metals; and a variety of other surface functionality can be used to bond the fluoronanodiamond to the surface. In some alternate embodiments, the fluoronanodiamond can first be reacted with a linker species, such as APTES to form a APTES-ND species, that can then be reacted with a suitable surface (in the case of APTES-ND, the species can be coupled with the —OH groups on unfunctionalized glass by first hydrolyzing the ethoxy groups on the APTES). Applications for such coatings include, but are not limited to, nano-electromechanical systems (NEMS) and micro-electromechanical systems (MEMS), field emission devices, sensors, chemically resistant coatings, tool coatings (e.g., drill bits), lubricating coatings, semiconducting devices, and applications benefiting from diamond's exceptional optical properties.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

Figure 3:
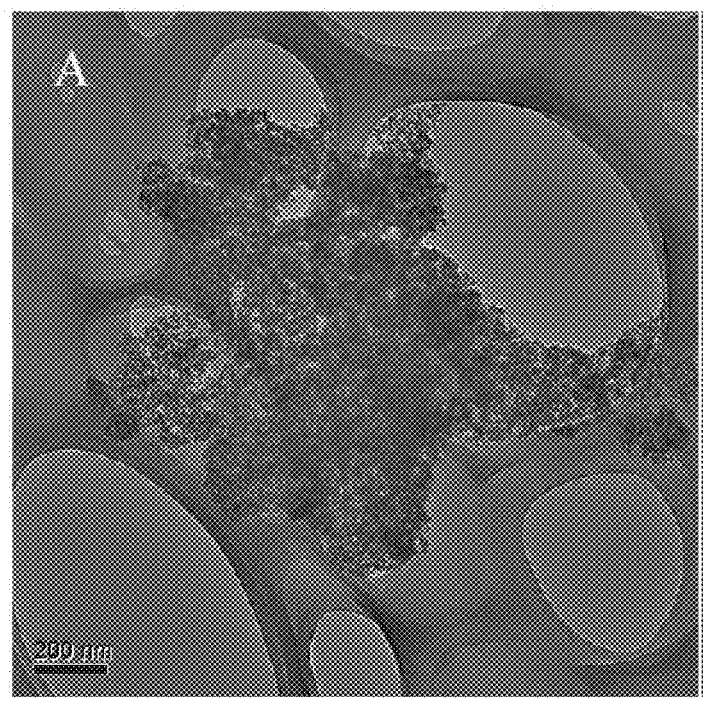
FIGS. 3A and 3B are scanning electron microscopy (SEM) images depicting (A) untreated ND, and (B) fluorinated ND (F-ND)
Figure 3:
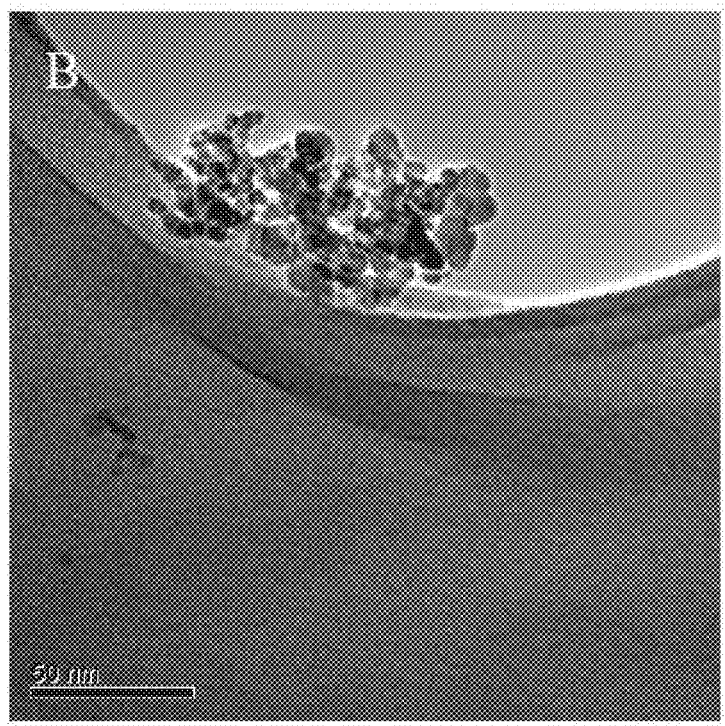

This example serves to illustrate how nanocrystalline diamond can be produced. As a source of nanocrystalline diamond (ND) Applicants used nanoscale diamond powder that was produced by explosive detonation (V. Y. Dolmatov, *Russian Chemical Reviews* 2001, 70, 607). This type of diamond powder is commercially available and relatively inexpensive, selling for less than ten dollars per gram. The ND powder described herein had a purity greater than 97% and was purchased from Nanostructured and Amorphous Materials, Inc. The detonation-synthesized nanodiamond powders comprised clusters of tiny diamond nanocrystals (nanocrystallites). The size of the nanocrystal was around 3.5-6.5 nm, and the average size of the clusters was between 1 and 2 μm, as depicted in the scanning electron microscopy (SEM) image of FIG. 3A.

EXAMPLE 2

This example serves to illustrate how nanocrystalline diamond can be fluorinated to yield fluorinated nanodiamond (F-ND). This involved the fluorination of nanodiamond via a reported procedure (Liu, Y.; Agrawal, N.; Gu, Z.; Peng, H.; Khabashesku, V. N.; Margrave, J. L. *Rice Quantum Institute 16th Annual Summer Research Colloquium.* Aug. 9, 2002, Houston, Tex., Abstr. p. 2; Khabashesku, V. N. "Functionalization of Carbon Nanomaterials for Bio-Medical Applications" in *Proceedings of International Meeting of German Society of Gerontology and Geriatrics: Extending the Life Span,* Sep. 24-26, 2003, Hamburg, Germany; V. N. Khabashesku, Y. Liu, J. L. Margrave, "Functionalization of Nanodiamond Powder through Fluorination and Subsequent Derivatization Reactions," United States Patent Publication No. 20050158549; Khabashesku, V. N. "Functionalization of Carbon Nanomaterials for Bio-Medical Applications," Book Chapter in *Extending the Life Span,* K. Sames, S. Sethe, A. Stolzing (Eds.). LIT Verlag, Münster, Hamburg, Berlin, London, c/o New York. 2005, pp. 147-152; Y. Liu, Z. Gu, J. L. Margrave, V. N. Khabashesku, *Chem. Mater.* 2004, 16, 3924-

3930). After fluorination of ND to yield fluoronanodiamond (F-ND), the cluster size of fluoronanodiamond grains was significantly decreased (to a few tens of nanometers), with their surface terminated by fluorine atoms, as shown in the SEM image of FIG. 3B. Energy dispersive analysis of X-rays (EDAX) data indicated that the F/C ratio in the fluoronanodiamond was about 9.3/100.

EXAMPLE 3

This example serves to illustrate some of the chemistry F-ND can undergo, and how such chemistry can be exploited to form coatings of ND. In previous studies (Khabashesku, V. N. "Fuctionalization of Carbon Nanomaterials for Bio-Medical Applications" in *Proceedings of International Meeting of German Society of Gerontology and Geriatrics: Extending the Life Span*, Sep. 24-26, 2003, Hamburg, Germany; V. N. Khabashesku, Y. Liu, J. L. Margrave, "Functionalization of Nanodiamond Powder through Fluorination and Subsequent Derivatization Reactions," United States Patent Publication No. 20050158549; Khabashesku, V. N. "Functionalization of Carbon Nanomaterials for Bio-Medical Applications," Book Chapter in "*Extending the Life Span*", Ed.: K. Sames, S. Sethe, A. Stolzing (Eds.). LIT Verlag, Münster, Hamburg, Berlin, London, c/o New York. 2005, pp. 147-152; Y. Liu, Z. Gu, J. L. Margrave, V. N. Khabashesku, *Chem. Mater.* 2004, 16, 3924-3930), Applicants have found that fluoronanodiamond reacts readily with the amino groups in ethylenediamine, as well as those in aminoacids. These molecules become covalently bonded to the ND particle surface after elimination of HF. Such chemistry serves as a basis for choosing a suitable molecule containing an —$NH_2$ functional group at one end as a linker moiety for ND surface bonding. 3-aminopropyltriethoxysilane (APTES) was chosen as such a linker, not only because it has a terminal amino group, but also because it is a commonly used coupling agent for the modification of a variety of substrate surfaces such as glass, quartz and metals (*Metal Organics for Material & Polymer Technology*, Ed. B. Arkles, Gelest Inc., 2001). As mentioned above, covalent bonds can be formed between APTES molecule and the substrate through the hydrolysis of the ethoxy groups followed by a coupling condensation involving the —OH groups on the substrate surface.

To confirm the chemical reaction between APTES and fluoronanodiamond, a "flask" experiment was carried out in a solution (i.e., liquid) phase by adding a slight excess of APTES to the fluoronanodiamond suspension in anhydrous 1,2-dichlorobenzene (ODCB). The reaction flask was kept at 130° C. for 24 hours under continuous stirring. The resulting powdered product was extensively washed on a glass filter and then dried in a vacuum oven overnight.

Figure 4:
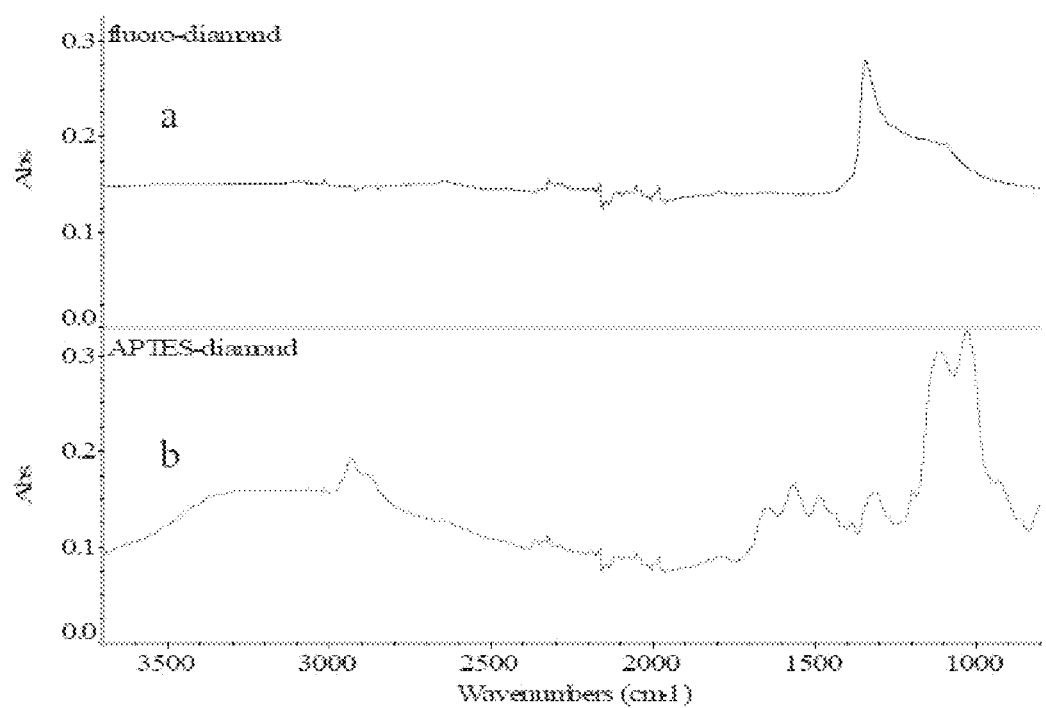
FIG. 4 depicts infrared spectra of F-ND (Trace a), and the product of the reaction between F-ND and APTES (Trace b), i.e., a F-ND-linker complex.

Fourier transform infrared (FTIR) spectral analyses of the resulting powder provided clear evidence for the occurrence of this reaction, which leads to the formation of a APTES-ND derivative, as depicted in FIG. 1, Scheme 1. In the FTIR spectrum of fluoronanodiamond (F-ND), shown in FIG. 4, Trace a, a single strong peak is due to the C—F bond stretches. After reaction with APTES, several new peaks corresponding to the features of APTES appeared in the FTIR spectrum, as shown in FIG. 4, Trace b. Other evidence for such reaction came from EDAX analysis, which indicated that the fluorine content in the sample was greatly reduced after reaction, from 9.3/100 in fluoronanodiamond to 1.2/100 (F/C) in APTES-ND.

Figure 2:
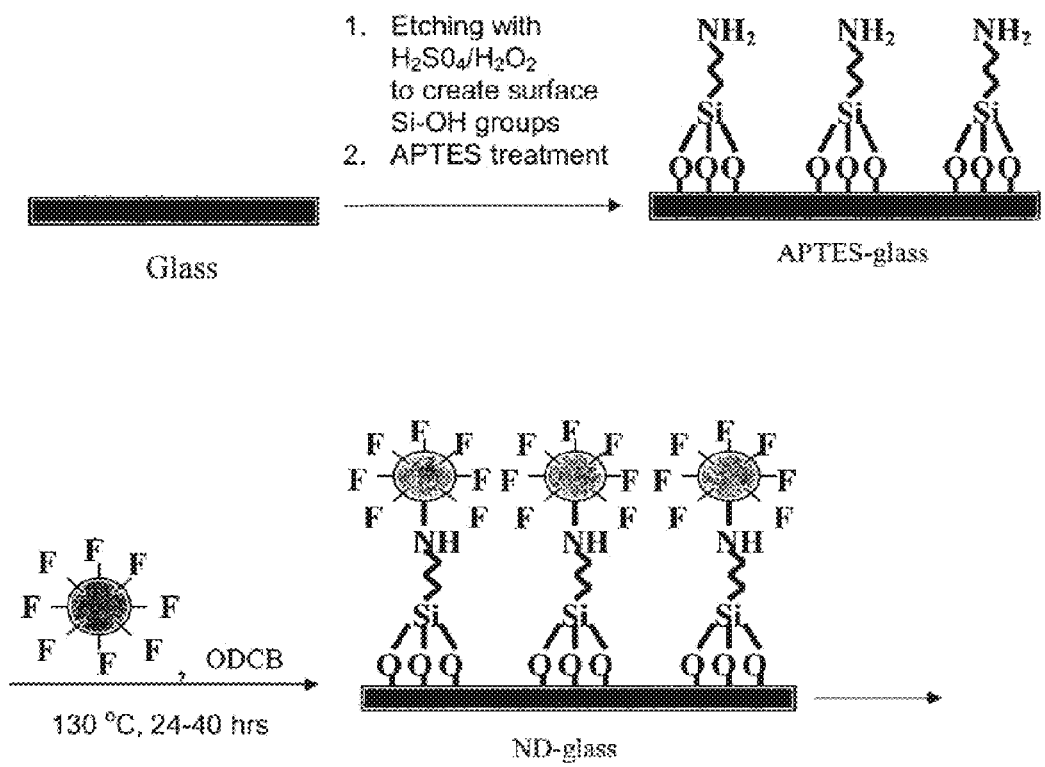
FIG. 2 (Scheme 2) depicts the functionalization of a glass surface such that the functionalized glass surface can operably react with fluorinated nanodiamond to yield a ND-coated glass surface.

Referring to FIG. 2, Scheme 2, after generating fluoronanodiamond, the next step of the coating process was carried out as follows: a small piece (1×1 cm) of a glass microscope slide was cleaned in piranha etch (7:3 v/v 98% $H_2SO_4$/30% $H_2O_2$) at 90° C. for 1 hour, rinsed with ultrapure water (Milli-Q system, Millipore), and dried with a stream of filtered $N_2$. The substrate was then immersed in a fresh 85 mM solution of APTES in ethanol for 30 minutes, after which it was washed with ethanol, gently dried under a $N_2$ stream, and cured in a vacuum oven at 100° C. for at least 2 hours to allow for a complete coupling of APTES molecules to the glass surface. Then, the APTES-treated glass substrate was immersed in a fluoronanodiamond/ortho-dichlorobenzene (ODCB) suspension created in a small vial. The vial was sealed and placed in an oven at 130° C. for 24-40 hours. After the reaction, the sample was rinsed with ethanol and then sonicated in ethanol for 30 minutes in order to remove all unbonded particles deposited on the surface. Finally, the substrate was dried in a flow of nitrogen gas for further measurements.

Figure 5:
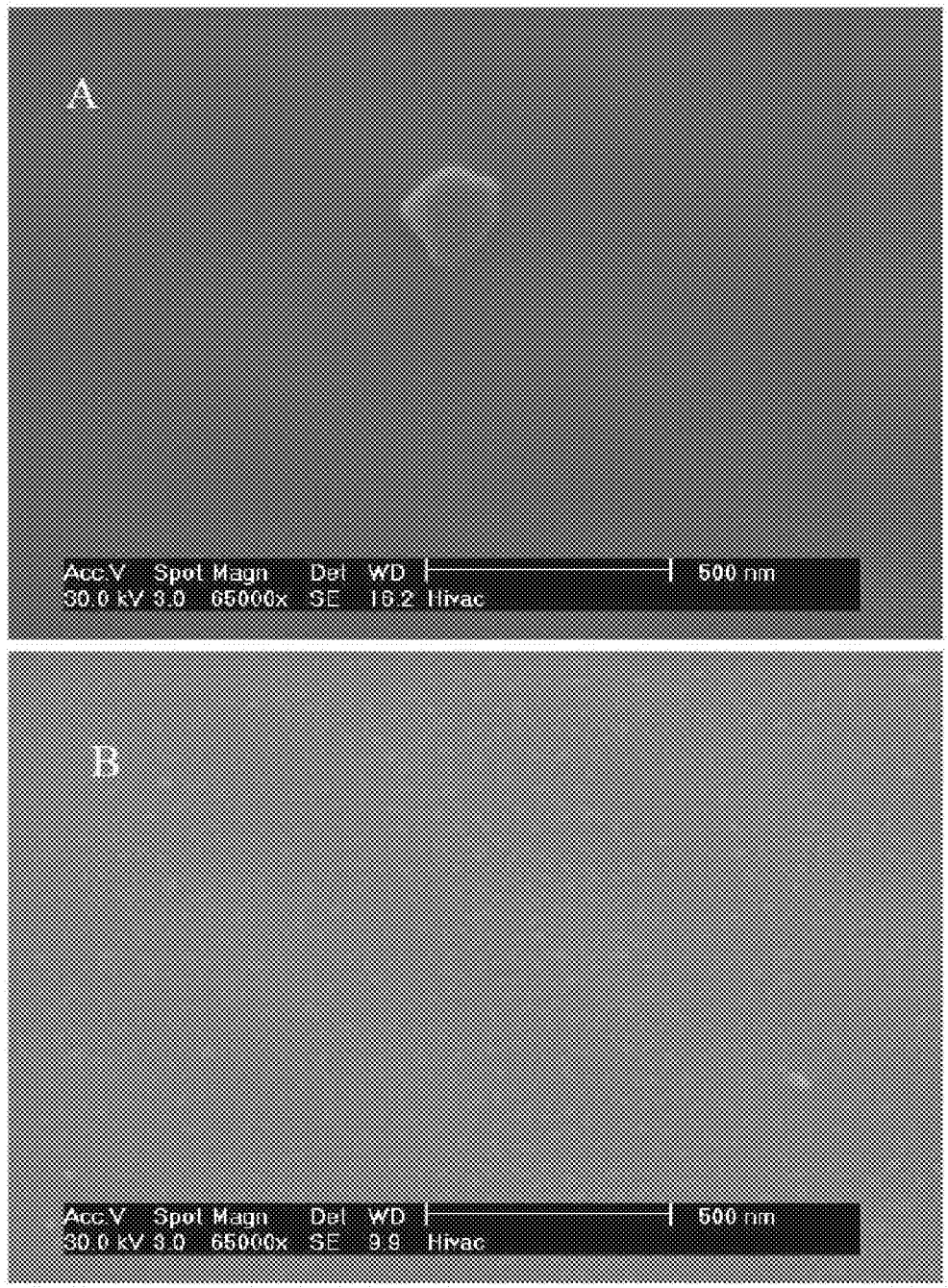
FIGS. 5A and 5B are SEM images depicting (A) pure glass, and (B) a ND-coated glass surface.
Figure 6:
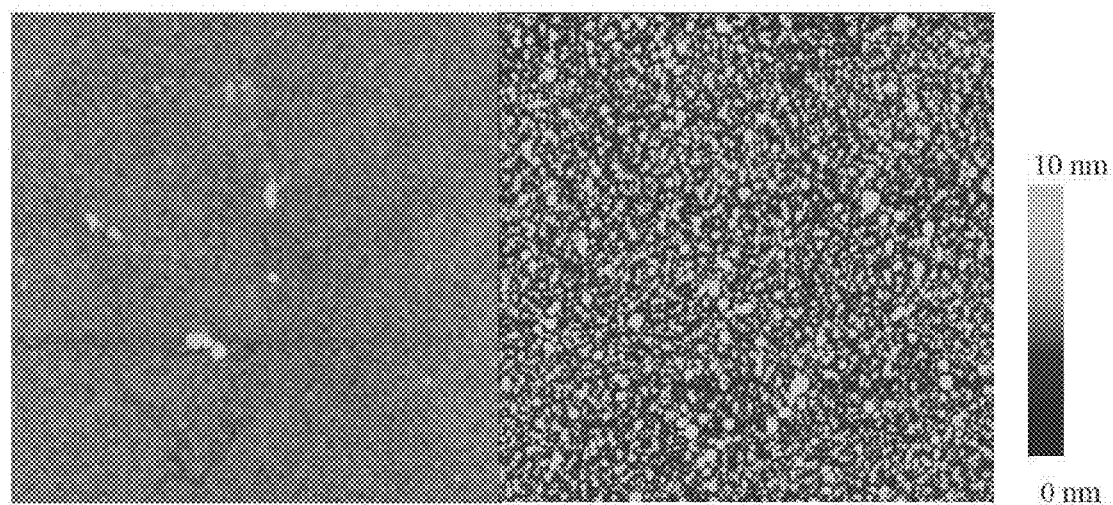
FIG. 6 is an atomic force microscopy (AFM) image of the ND-coated glass surface depicted in FIG. 5B.
Figure 7:
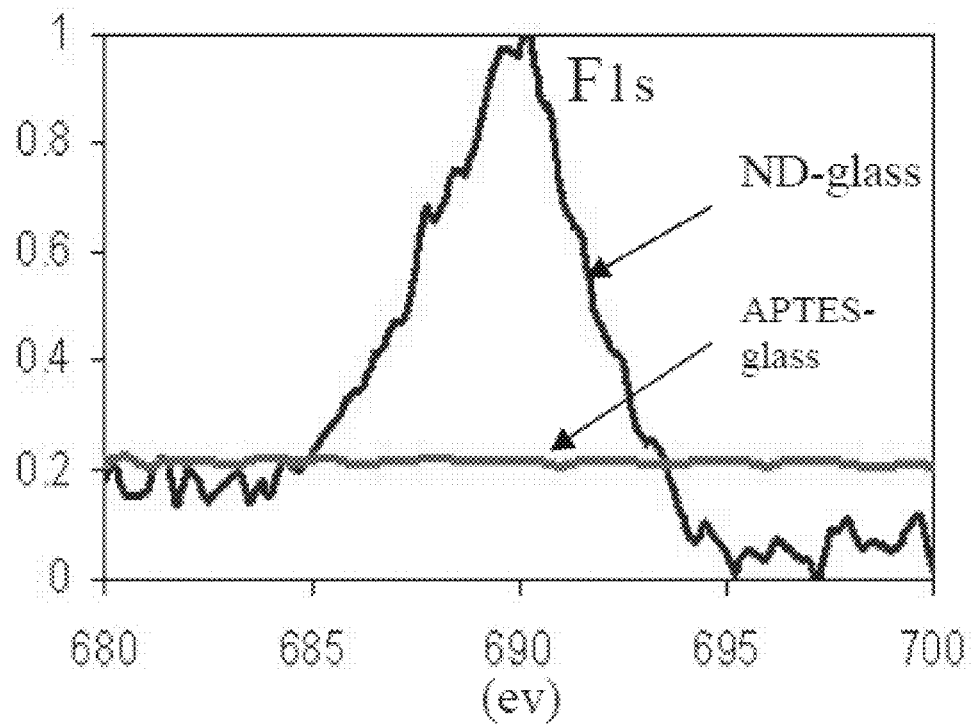
FIG. 7 depicts X-ray photoelectron spectra of ND-coated glass and APTES-glass, wherein only the former comprises fluorine atoms.

The ND-coated glass substrate was examined by scanning electron microscopy (SEM), atomic force microscopy (AFM), and X-ray photoelectron spectroscopy (XPS). FIGS. 5A and 5B shows an SEM comparison of pure glass (A) to the ND-coated glass substrate (B). From the SEM images, one can clearly see the difference in appearance before and after the coating, where a great number of spots are seen on the surface of ND-glass sample. The ND particles, with sizes ranging from 10 to 50 nm, almost completely cover the surface. AFM (FIG. 6) surface characterization data are also consistent with the SEM image observations. XPS analysis provides further evidence for the presence of ND particles bonded to the glass surface. The dramatic increase of the at. % carbon measured on the surface was due to diamond (Table 1). Additionally, important data is provided by the observation of a fluorine peak in the XPS after coating (FIG. 7). Since the fluorine atoms on the very top of each ND particle will not react with the amino groups on the glass surface due to steric effects, there should be a considerable amount of covalently-bound fluorine remaining on the ND—after bonding of the ND to the glass surface. Thus, the observed fluorine peak further proves the presence of the ND particles on the glass surface.

TABLE 1

| | Element at. (%) content from XPS | |
|---|---|---|
| Elements | APTES-glass | ND-glass |
| Si2p | 26.1 | 21 |
| O1s | 63 | 50.5 |
| C1s | 9.8 | 26 |
| N1s | 1.1 | 0.4 |
| F1s | 0 | 2.1 |

EXAMPLE 4

Figure 8:
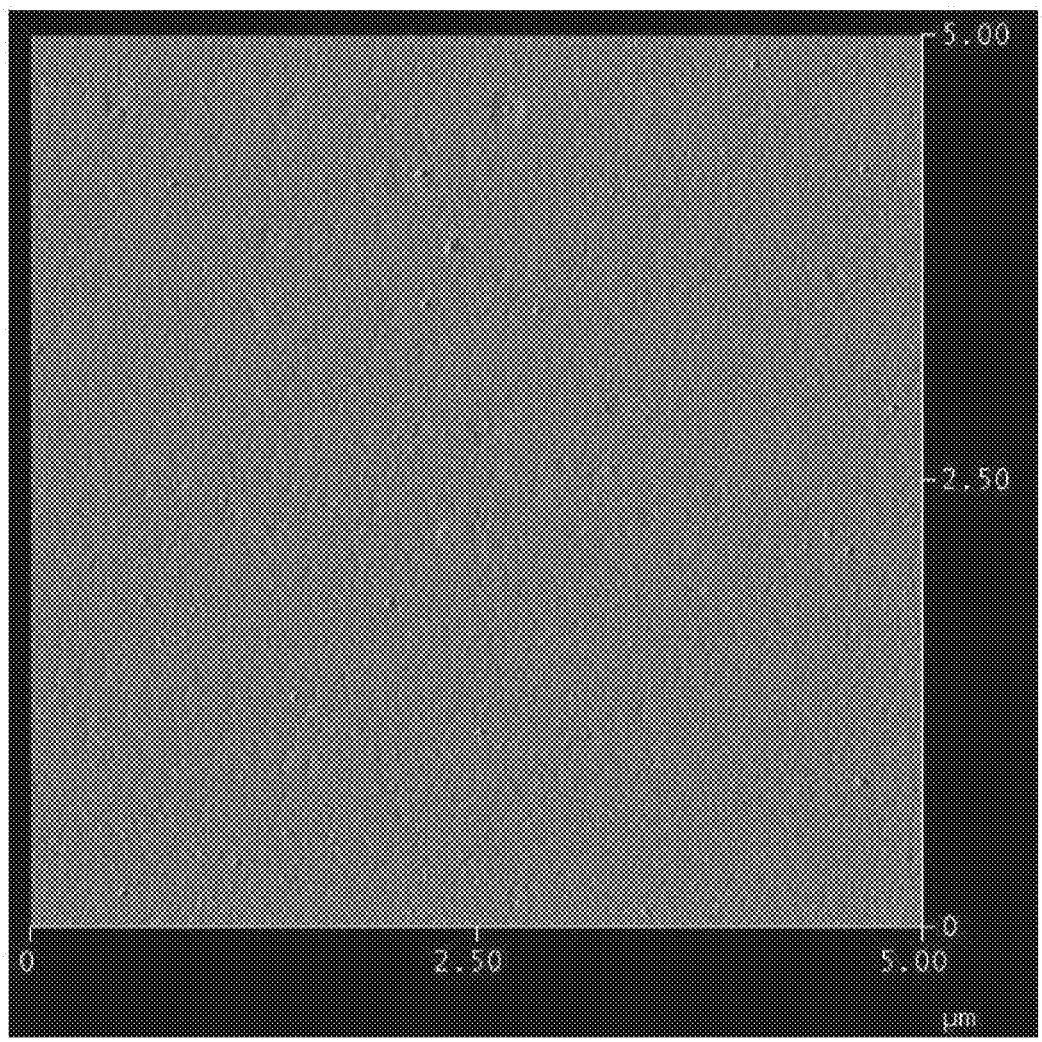
FIG. 8 is an AFM image of a APTES-treated silicon surface.
Figure 9:
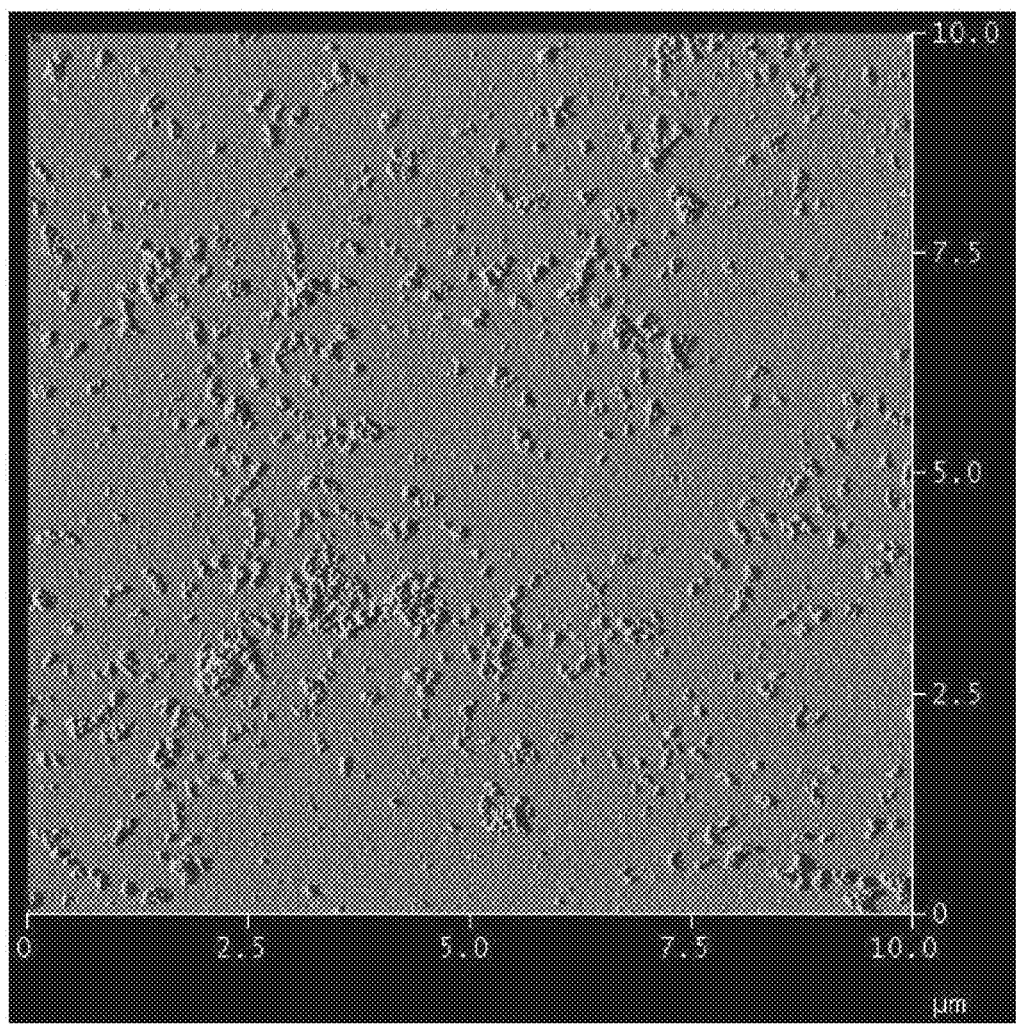
FIG. 9 is an AFM image of a silicon surface after diamond coating.

This example serves to illustrate how silicon substrates can also be coated by generally following the above-described coating procedure. FIGS. 8 and 9 are AFM images of a silicon surface before and after coating, respectively. It is clearly seen that there are particles on said surface after reaction. However, the particles are isolated like islands, which is quite different from the continuous coatings seen on coated glass substrate. It is believed that the silicon surface is much more oxidation resistant than that of glass, which suggests that there might not be plenty of hydroxyl groups for surface silanation. Therefore, it is likely that fluoronanodiamond particles can only be attached to those areas with enough amino groups.

EXAMPLE 5

Figure 10:
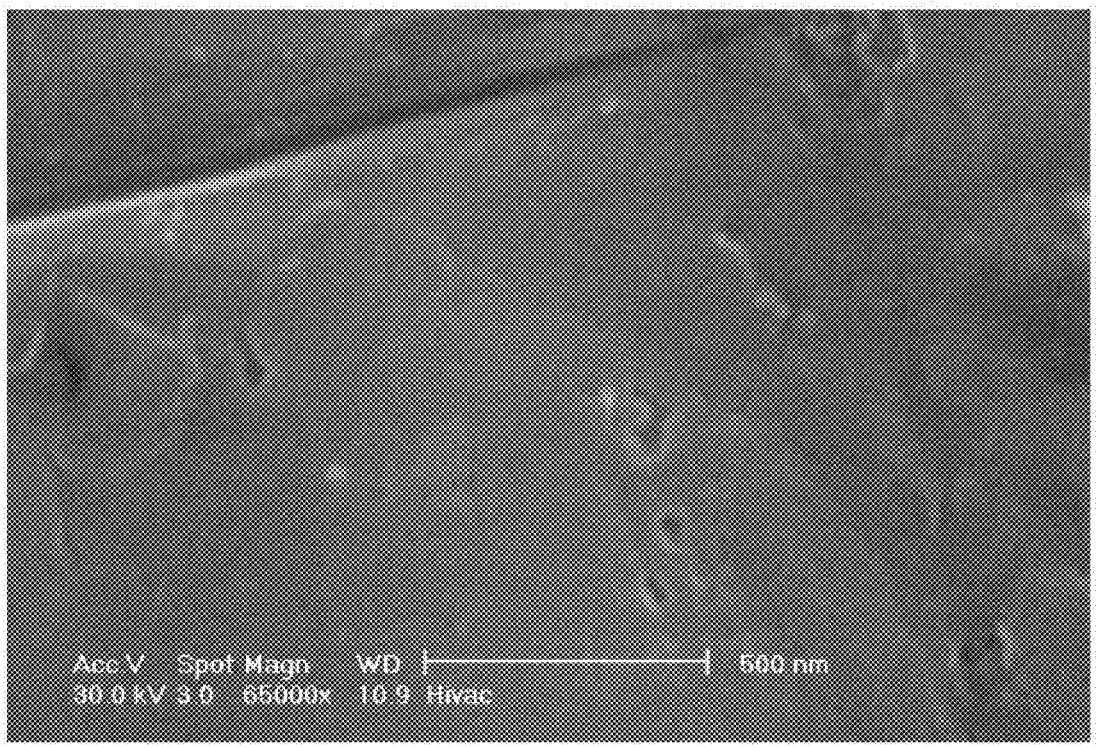
FIG. 10 is an SEM image of an APTES-treated steel surface.
Figure 11:
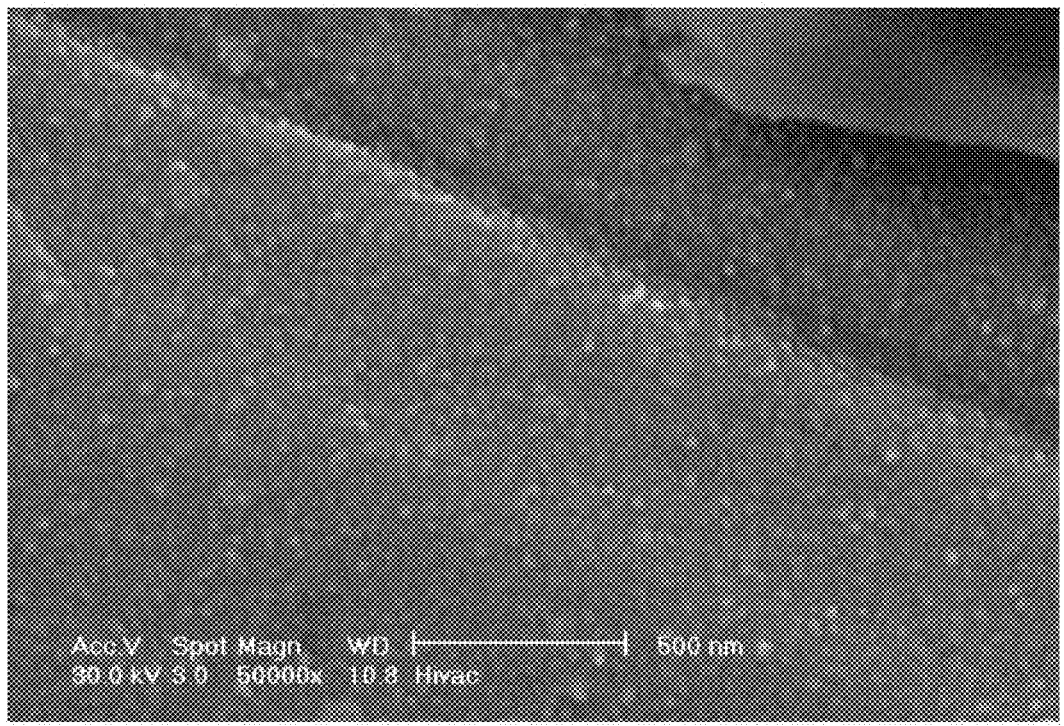
FIG. 11 is an SEM image of a steel surface after diamond coating.

This example serves to illustrate how the above-described coating methods can also be employed to form nanodiamond coatings on steel. Upon carrying out such coating processes on steel, differences were seen before and after reaction, as verified the SEM images of FIGS. 10 and 11, respectively.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
    a) providing a quantity of fluorinated nanodiamond and a functionalized surface comprising functional moieties, wherein the functional moieties comprise silane linker species capable of reacting with the fluorinated nanodiamond; and
    b) reacting the fluorinated nanodiamond with the functionalized surface to form a nanodiamond coating on the surface, said nanodiamond coating comprising nanodiamond crystals covalently linked to the surface by the silane linker species on the functional moieties.

2. The method of claim 1, wherein the functionalized surface is selected from the group consisting of a functionalized ceramic surface, a functionalized glass surface, a functionalized polymer surface, a functionalized semiconductor surface, a functionalized metal surface, and combinations thereof.

3. The method of claim 1, wherein the functionalized surface is selected from the group consisting of a functionalized glass surface, a functionalized silicon surface, a functionalized steel surface, and combinations thereof.

4. The method of claim 3, wherein the glass surface is functionalized with APTES.

5. The method of claim 1, wherein the reacting is carried out in a liquid.

6. The method of claim 5, wherein the liquid is ODCB.

7. The method of claim 1 further comprising a washing step to remove any unbound nanodiamond from the surface.

8. The method of claim 1, wherein the silane linker species comprises an amine that is covalently bound to the fluorinated nanodiamond.

9. A method comprising the steps of:
    a) providing a quantity of fluorinated nanodiamond;
    b) reacting the fluorinated nanodiamond with a silane linker species to form a nanodiamond-linker complex; and
    c) reacting the nanodiamond-linker complex with a surface to form a nanodiamond coating on the surface, said nanodiamond coating comprising nanodiamond crystals covalently linked to the surface by the silane linker species.

10. The method of claim 9, wherein surface is selected from the group consisting of a ceramic surface, a glass surface, a polymer surface, a semiconductor surface, a metal surface, and combinations thereof.

11. The method of claim 9, wherein the surface is selected from the group consisting of a glass surface, a silicon surface, a steel surface, and combinations thereof.

12. The method of claim 9, wherein the surface comprises functional moieties operable for covalent bonding with the nanodiamond-linker complex.

13. The method of claim 9, wherein the reacting steps are carried out in a liquid.

14. The method of claim 9, wherein the silane linker species is APTES.

15. The method of claim 9, wherein the silane linker species comprises an amine that is covalently bound to the fluorinated nanodiamond.

* * * * *